US 8,490,120 B2

(12) United States Patent
Cable

(10) Patent No.: US 8,490,120 B2
(45) Date of Patent: Jul. 16, 2013

(54) SYSTEM AND METHOD FOR THE SERVICE CONFIGURATION OF APPLICATION SERVER ENVIRONMENTS

(75) Inventor: Larry Cable, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1065 days.

(21) Appl. No.: 12/209,175

(22) Filed: Sep. 11, 2008

(65) Prior Publication Data
US 2009/0070792 A1  Mar. 12, 2009

Related U.S. Application Data

(60) Provisional application No. 60/971,829, filed on Sep. 12, 2007.

(51) Int. Cl.
G06F 3/00     (2006.01)
G06F 9/44     (2006.01)
G06F 9/46     (2006.01)
G06F 13/00    (2006.01)

(52) U.S. Cl.
USPC .......................................... 719/332; 719/331

(58) Field of Classification Search
None
See application file for complete search history.

(56) References Cited

U.S. PATENT DOCUMENTS

| 6,393,605 B1 | 5/2002 | Loomans |
| 6,523,166 B1 | 2/2003 | Mishra |
| 6,983,315 B1 | 1/2006 | Crutcher |
| 7,051,316 B2 | 5/2006 | Charisius |
| 2005/0108702 A1 | 5/2005 | Baker |
| 2006/0112379 A1 | 5/2006 | Chirakansakcharoen |

OTHER PUBLICATIONS

Sven Haiges; OSGi Tutorial: A Step by Step Introduction to OSGi Programming Based on the Open Source Knopflerfish OSGi Framework; Oct. 2004; 25 pages.*
About the OSGi Service Platform: Technical Whitepaper; Jun. 2007; 20 pages.*
OSGi Alliance; Lazy Activation Policy; http://www.osgi.org/Design/LazyStart; archived Dec. 1, 2006; 5 pages.*
.NET Assemblies, GAC, Versioning, Manifests and Deployment, http://www.thescarmhttp://www.thescarms.com/dotnet/Assembly.aspxs.com/dotnet/Assembly.aspx, Nov. 27, 2008, 5 pages.
How to Load an Assembly at Runtime That is Located in a Folder That is Not the Bin Folder of the Application, http://support.microsoft.com/kb/837908, Nov. 27, 2008, 8 pages.
Stal, et al., "Activator", http://www.stal.de/Downloads/Activator.pdf, Nov. 9, 2005, 26 pages.
Apache 1.3 Dynamic Shared Object (DSO) Support, http://httpd.apache.org/docs/1.3/dso.html, Nov. 27, 2008, 5 pages.

(Continued)

Primary Examiner — H S Sough
Assistant Examiner — Kimberly Jordan
(74) Attorney, Agent, or Firm — Fliesler Meyer LLP

(57) ABSTRACT

A system and method for dynamic, application dependency implicit, service configuration of application server environments. A dynamic and implicit mechanism can be provided using technologies such as OSGi and the Java Module System, that then reduce the need for external application server configuration. An application server so implemented can be enabled to dynamically/lazily load the required services implementations on demand, at the time an application is deployed and/or initialized at runtime, and to subsequently release any such resources consumed when they are no longer required.

20 Claims, 2 Drawing Sheets

OTHER PUBLICATIONS

Apache HTTP Server Version 2.0, http://httpd.apache.org/docs/2.0/mod/mod_so.html, Nov. 27, 2008, 2 pages.
Dynamic Module Deployment, http://livedocs.adobe.com/jrun/4/Assembly_and_Deployment_Guide/deploy3.htm, Nov. 27, 2008, 2 pages.
JRun Features, http://livedocs.adobe.com/jrun/4/Getting_Started_with_JRun/intro5.htm, Nov. 27, 2008, 4 pages.
A Comparison of Eclipse Extensions and OSGi Services, http://www.eclipsezone.com/articles/extensions, Nov. 27, 2008, 11 pages.
Coyler, et al., "Spring and OSGI", https://jira.springsource.org/secure/attachment/11891/spring_and_osgi.html, Nov. 27, 2008, 14 pages.
OSGi Alliance, OSGi Technology, http://www.osgi.org/About/Technology?section=2, Dec. 28, 2011, 5 pages.
The Java Community Process(SM) Program—JSRs: Java Specification Requests, http://www.jcp.org/en/jsr/detail?id=277, Dec. 28, 2011, 8 pages.
OSGi Alliance, OSGi Platform and JavaEE integration, RFP 098, Open Distribution, Draft 0.1, A Component Model for OSGi, Jul. 20, 2007, 8 pages.
IBM Corporation, IBM Software Group, IBM Education Assistant, IBM WebSphere Application Server V6.1 Componentization Overview, May 12, 2006, 16 pages.
The Eclipse Foundation, Equinox, http://www.eclipse.org/equinox/, Dec. 28, 2011, 2 pages.

* cited by examiner

SYSTEM AND METHOD FOR THE SERVICE CONFIGURATION OF APPLICATION SERVER ENVIRONMENTS

CLAIM OF PRIORITY

This application claims the benefit of priority to U.S. Provisional Patent Application titled "SYSTEM AND METHOD FOR THE SERVICE CONFIGURATION OF APPLICATION SERVER ENVIRONMENTS"; Application Ser. No. 60/971,829; filed Sep. 12, 2007, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to enterprise application systems, and service-oriented architecture (SOA), and is particularly related to a system and method for dynamic, application dependency implicit, service configuration of application server environments.

BACKGROUND

The Java language, and it's associated platforms the Java Standard Edition platform and the Java Enterprise Edition platform, have established themselves as industry standard environments for the deployment of a broad variety of applications. In particular, the Java Enterprise Edition platform is a mature environment used by many of the world's major enterprises for the creation and execution of their mission critical applications. Application server platforms such as, but not limited to, the Java Enterprise Edition platform, are typically composed of, and provide, a broad set of Services, such as Application Programming Interfaces (e.g., Enterprise JavaBeans, Servlets, JavaServer Pages, JDBC, and JMS), and other capabilities such as security, high availability, transaction processing etc, that are consumed either directly or indirectly by software applications that are written against those APIs.

Today, most such platform products and technologies are delivered monolithically, i.e. their implementations are packaged as a collection of Java class files within one or more Java ARchive files (JARs), which are in turn invoked by the Java Virtual Machine during runtime to provide the actual, executable, implementation of these application services. A significant and costly drawback of this monolithic approach to packaging and invocation is that the resulting runtime environment of the application server (i.e. the Java Virtual Machine or another virtual machine environment) consumes significant amounts of both physical and virtual memory, and CPU processing time, independently of the actual requirements of the particular set of applications that is running therein. This costly space/time/complexity inefficiency is the result of the monolithic and static packaging of the individual components and services that comprise the application server or Java Enterprise Edition platform.

Current available technologies that are designed to undertake this optimization are limited, in that their typical usage is to re-package the implementations of an application server's components into bundles, and to then load/initialize a subset of all the possible bundles at application server startup from a static, externally defined, application server bundle/component initialization/configuration description. For example, versions of both the JBoss and IBM WebSphere application servers use just such a mechanism.

SUMMARY

Disclosed herein is a system and method for dynamic, application dependency implicit, service configuration of application server environments. A dynamic and implicit mechanism can be provided using technologies such as OSGi and the Java Module System, that then reduce the need for external application server configuration. An application server so implemented can be enabled to dynamically/lazily load the required services implementations on demand, at the time an application is deployed and/or initialized at runtime, and to subsequently release any such resources consumed when they are no longer required. The mechanism and apparatus for such an application server implementation is the subject of this application.

DETAILED DESCRIPTION

Figure 1:
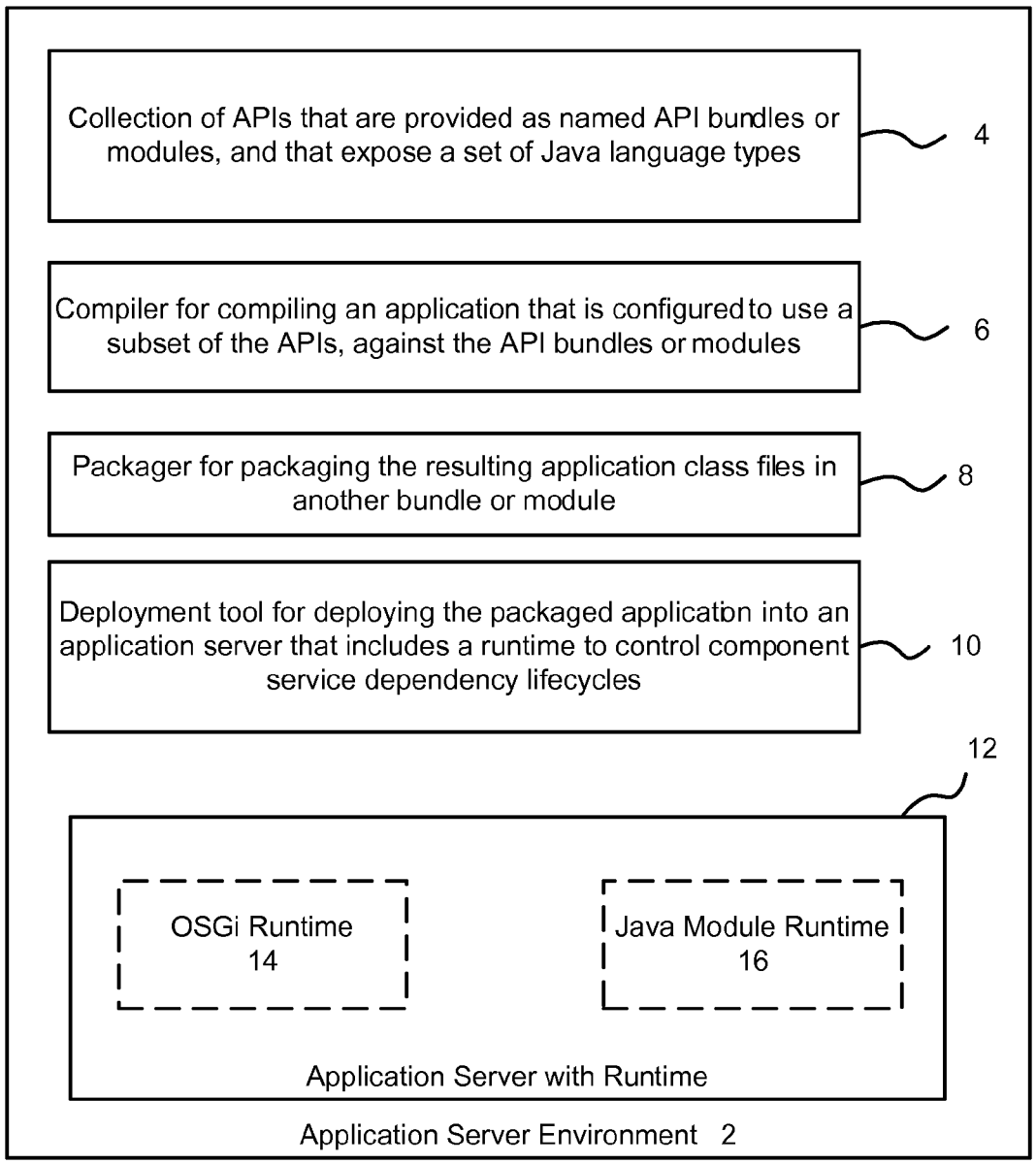
FIG. 1 shows a system for dynamic, application dependency implicit, service configuration of application server environments, in accordance with an embodiment.

As described above, a significant and costly drawback of the monolithic approach to packaging and invocation in an application server environment is that the resulting runtime environment of the application server (i.e. the Java Virtual Machine or another virtual machine environment) consumes significant amounts of both physical and virtual memory, and CPU processing time, independently of the actual requirements of the particular set of applications that is running therein. A number of technologies attempt to address this problem of monolithic packaging and wasteful resource consumption, including for example OSGi (described in JSR 291: Dynamic Component Support for Java SE, and by the OSGi Alliance Specifications, both of which are herein incorporated by reference) and the Java Module System (described in JSR 277: Java Module System, and also herein incorporated by reference).

Both the OSGi and Java Module System technologies are intended to solve the packaging, dependency management, and dynamic resource lifecycle of the Java language based software systems. Both technologies depend upon the dynamic class loading capabilities of the Java programming language, together with packaging module dependency and other implementation metadata, to discover and control the transitive closure of (type) interdependencies between "consumer" module(s), their dependent "service" (provider) modules, and associated lifecycle(s) during the execution lifecycle of such applications. For example, a number of open-source and commercially available application server products use OSGi to package, configure and manage the component services therein to optimize both the set of services active during the lifetime of a server instance, in addition to the dependencies and resources resultant from that usage.

However, currently available technologies that are designed to undertake this optimization are limited, in that their typical usage is to re-package the implementations of an application server's components into, e.g. OSGi bundles, and to load/initialize a subset of all of the possible bundles at application server startup, from a static externally defined application server bundle/component initialization/configuration description As disclosed herein, in accordance with an embodiment, and a system and method are provided for the dynamic, application dependency implicit, service configuration of application server environments.

Consider an application server platform implemented using either the Java Standard Edition platform or the Java Enterprise Edition platform. Such platforms expose services and/or capabilities to applications written to that platform's public standardized Application Programming Interfaces (APIs).

Typically, these APIs (which are manifest as either Java classes or interfaces compiled to, and described in a Java class file format) are collected and packaged into a Java ARchive (JAR) or .jar file. For example, in the Java Enterprise Edition platform, one might find a servlet-api.jar or similar such collections for EJB, JMS, JDBC, and JavaMail. These "API" .jar files describe the public interface contract of a particular conforming implementation of the Application server platform. Applications wishing to use a particular subset of these APIs are compiled against these packages. The resulting application class files are collected into their own application packages or .jar files, and are subsequently deployed onto conforming implementations of the Application server for execution.

As described above, this traditional approach typically results in service implementations being eagerly loaded, and consuming resources, regardless of the actual requirements or dependencies of the applications running therein. Alternatively an a priori knowledge of those dependencies can be enumerated and encoded into an external configuration file that is interpreted at application server startup to configure/initialize a subset of the services available as needed. Neither of these is optimal. Ideally, an application server should dynamically determine the requirements/dependencies of a particular application as that application is initialized. Both OSGi and the Java Module System describe a mechanism whereby an arbitrary bundle (a collection of Java .class files contained within a .jar file, along with additional OSGi specific metadata), or a module, can both control the visibility of the APIs it implements, and also describe those direct dependencies of the APIs contained therein, either in terms of references to other bundle/module names and/or as a list of (wildcardable) Java language types.

Figure 2:
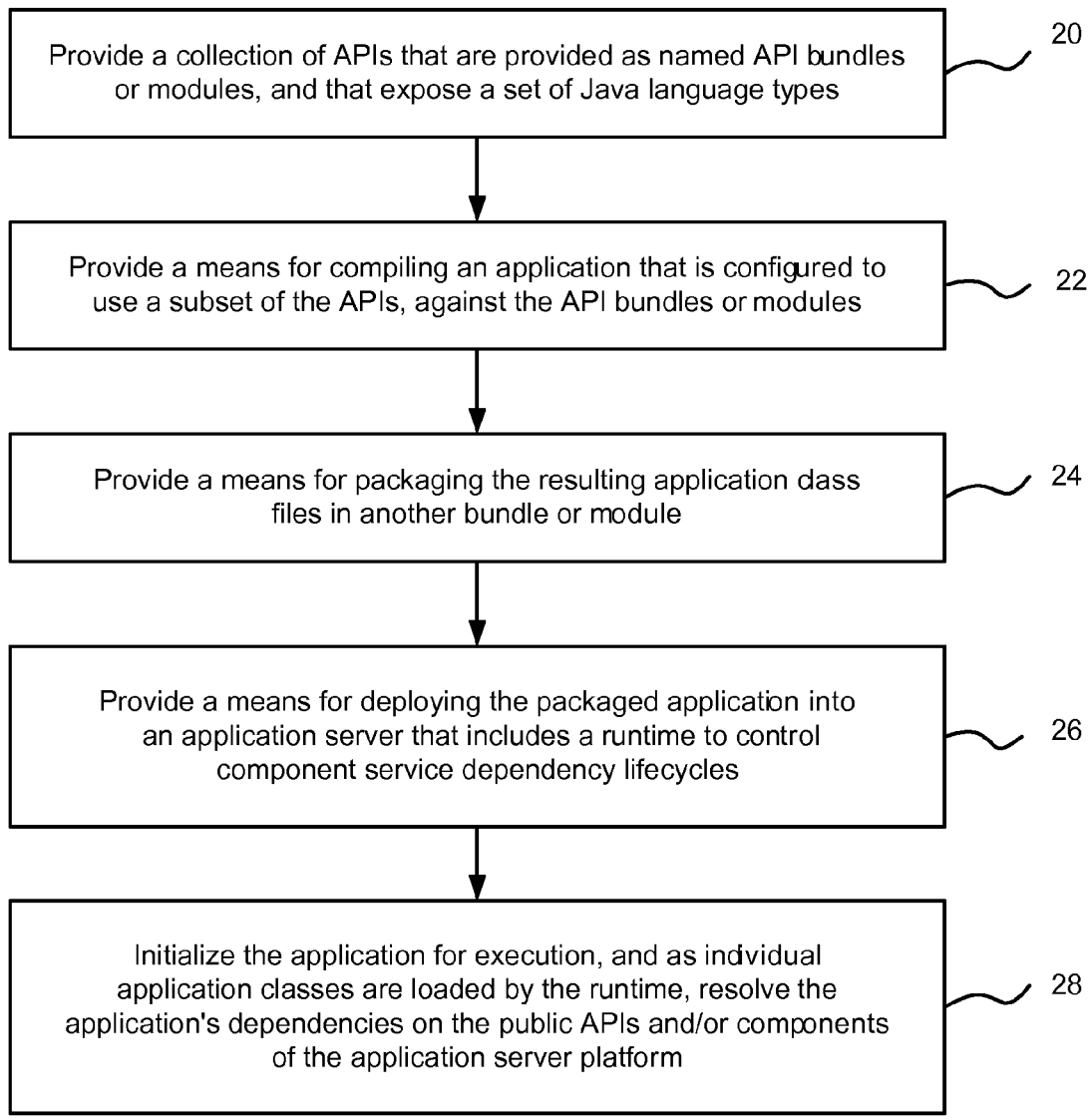
FIG. 2 shows a flowchart of a method for dynamic, application dependency implicit, service configuration of application server environments, in accordance with an embodiment.

FIG. 1 shows a system for dynamic, application dependency implicit, service configuration of application server environments, in accordance with an embodiment. As shown in FIG. 1, in accordance with an embodiment the system comprises an application server environment 2, application server with runtime 12, OSGi runtime 14, and Java module runtime 16. The system also comprises a collection of APIs that are provided as named API bundles or modules, and that expose a set of Java language types 4, a compiler for compiling an application that is configured to use a subset of the APIs, against the API bundles or modules 6, a packager for packaging the resulting application class files in another bundle or module 8, and a deployment tool for deploying the packaged application into an application server that includes a runtime to control component service dependency lifecycles 10. FIG. 2 shows a flowchart of a method for dynamic, application dependency implicit, service configuration of application server environments, in accordance with an embodiment. As shown in FIG. 2, in step 20 a collection of APIs are provided as named API bundles or modules, and that expose a set of Java language types. In step 22, an application that is configured to use a subset of the APIs, is compiled against the API bundles or modules. In step 24, the resulting application class files are packaged in another bundle or module. In step 26, the packaged application is deployed into an application server that includes a runtime to control component service dependency lifecycles. In step 28, the application is initialized for execution, and as individual application classes are loaded by the runtime, the system resolves the application's dependencies on the public APIs and/or components of the application server platform. In accordance with an embodiment, a system and method is provided in which the collection of platform APIs are described as a set of standardized, named, API bundles or modules that only expose the set of Java language types that comprise their associated standard API in the Java Enterprise Edition platform, for example: Servlet, EJB, JMS, and JDBC, etc. An application wishing to use a subset of those APIs is compiled against those bundles/modules. The resulting application .class files are packaged in a standard packaging format (based upon jar) as applicable, such as either a .jar, .war, or .ear, along with the appropriate meta-data describing those dependencies. Such a packaged application can then be deployed into an application server, that is implemented using either the OSGi or Java Module System runtime (in it's classload hierarchy) to control component/service dependencies/lifecycles. When such an application server initializes the application for execution, as individual applications and their associated classes are deployed and subsequently loaded by the Java Virtual Machine (in which both the application server and the application reside and execute) on behalf of the application server resident therein, the Java Virtual Machine can (in some instances recursively) invoke the class loading machinery associated with the container particular to the specific API (such as Servlet, or EJB), which recursively invokes the class loading machinery of either OSGi or the Java Module System, to resolve the application's dependencies on the public APIs and/or components of the application server platform.

When invoked, the class loading machinery of OSGi or the Java Module System can determine in which bundle or module a particular API type reference resides, and if that reference, bundle or module has not previously been referenced then the machinery loads that bundle or module, initializes it according to their lifecycle models, resolves all its dependencies, and satisfies the class loading reference. In this manner, a minimal application server environment comprising this infrastructure and/or embodying the system or method described above, can dynamically determine, at application initialization time, implicitly from the APIs referenced by that application, which underlying services are required to be lazily loaded and initialized (i.e. late bound), in order to optimally satisfy only the transitive closure of the dependencies of that application alone.

For example, consider a Java Enterprise Edition application that only uses the Servlet API. In accordance with an embodiment it can be compiled against the servlet-api.jar (OSGi bundle). The resulting application class files and application meta-data are packaged in a standard Web ARchive (WAR) or .war file, that can be, but is not required to be, an OSGi bundle itself, (which would contain OSGi specific meta-data describing the applications dependency on either javax.servlet.* or the servlet-api.jar file itself). This application is subsequently deployed onto an OSGi enabled application server, such as an OSGi enabled version of the WebLogic Server. This application server can initialize itself with a lightweight minimal set of services and the OSGi or Java Module System runtime environment, and during initialization detect the presence of previously deployed applications, or, subsequent to initialization have new (or existing) applications (re)deployed to it, and attempt to initialize those applications to prepare them for execution. The application service platform only requires a service/component that is capable of interrogating such deployed application artifacts and loading/initializing their contents, and may not require full implementations of the underlying services/components.

In accordance with an embodiment, the application runtime interrogates a particular application's packages, and loads/initializes the application code packaged therein. As application code is loaded and initialized, unsatisfied references to particular Java language types invoke the Java Virtual Machine's specified class loading machinery. In this case, as a result of the presence of an OSGi runtime, this results in the delegation of that unsatisfied reference to the OSGi (or Java Module System) runtime to subsequently satisfy from its knowledge base of types and containing/implementing bundles. When this delegation occurs the OSGi runtime can determine where the code that implements the unsatisfied reference is packaged, either directly through the reference to the name of the implementing bundle; or indirectly by examining the set of bundles accessible through the current class path for a bundle that exports implementation in a matching namespace.

Once the implementing/containing bundle is identified, on initial reference, the OSGi runtime, according to it's specified lifecycle semantics, can (in some instances recursively) load/initialize the containing/implementing bundle (and it's transitive closure of dependencies) including, significantly, calling into bundle specific/specified initialization code. Therefore in the above example, when the application server platform loads/initializes this application, during initialization, the dependency upon elements of the Servlet API are detected, and load requests are delegated to the application servers OSGi runtime. This in turn results in the dynamic loading and initialization of both the servlet-api.jar, the API classes therein, and their dependencies in turn. Should this application servers servlet-api.jar bundle be packaged accordingly, this can result in the application servers implementation of the Servlet container being loaded and initialized "just-in-time" dynamically, and implicitly, based upon the application's dependencies.

Since the example application described above does not reference JMS, EJB, JDBC, etc., these services/components need not be loaded and initialized at all. Therefore the resulting cost of initializing the runtime environment and services required therein is optimized for space/time/complexity, and the process is performed completely dynamically based upon implicit dependencies derived from the application itself. Subsequently should the application terminate (either through failure or explicit external action), the OSGi runtime in the application server can determine that no application dependencies are outstanding on types packaged within servlet-api.jar, and the application server can then stop the, e.g., Servlet container/service, and unload the associated service, implementing types, and containing bundles, thus reclaiming runtime resources for other applications, as needed.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic environment, other application servers, virtual machines, JVMs, computing environments and software development systems may use and benefit from the invention. It will also be evident that while the examples described herein generally describe the use of the system and method with regard to pluralities of class files, archive files, applications, implementations, components, services, modules, lifecycles, platforms, packages, language types, and API bundles, that in other embodiments single ones of some or all of these elements may be present. The code and examples given are presented for purposes of illustration. It will be evident that the techniques described herein may be applied using other code languages, and with different code and examples.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for the dynamic, application dependency implicit, service configuration of application server environments, comprising:
    a computer including a processor;
    a collection of Application Programming Interfaces (APIs) that are provided as named API bundles or modules, and that expose a set of Java language types;
    a compiler for compiling an application that is configured to use a subset of the APIs, against the API bundles or modules;
    a packager for packaging resulting application class files in another bundle or module;
    a deployment tool for deploying the packaged application into an application server, wherein the application server includes
        a runtime to control component service dependency lifecycles, wherein the runtime includes a knowledge base of types and containing or implementing bundles, and
        a set of public APIs and/or components; and wherein, when the application server subsequently initializes the application for execution, and as individual application classes are loaded by the runtime, the runtime resolves the application's dependencies on the public APIs and/or components of the application server, including interrogating the application's packages, determining unsatisfied references to particular Java language types, and invoking the runtime to satisfy the unsatisfied references using its knowledge base, and as each containing or implementing bundle is identified, loading or initializing by the runtime, according to its specified lifecycle semantics, the containing or implementing bundle.

2. The system of claim 1, wherein the packager for packaging the resulting application class files in another bundle or module further comprises packaging an appropriate meta-data describing the application's dependencies on the public APIs and/or components of the application server, either as a list of dependent Java language types, or by direct reference to a list of defining/containing standard modules or bundles.

3. The system of claim 1, wherein the runtime to control component service dependency lifecycles comprises one of Open Services Gateway initiative (OSGi) or Java Module System runtimes.

4. The system of claim 3, wherein the runtime comprises a Java Virtual Machine, and wherein the Java Virtual Machine invokes a class loading component associated with a container particular to the subset of the APIs, which then recursively invokes a class loading component of the one of OSGi or Java Module System runtimes, to resolve the application's dependencies on the public APIs and/or components of the application server.

5. The system of claim 3, wherein when invoked the one of OSGi or Java Module System runtimes determines in which bundle or module a particular type reference resides, and if that reference, bundle or module has not previously been referenced then the runtime loads that bundle or module, initializes it according to its lifecycle models, and satisfies any class loading reference.

6. The system of claim 1, wherein the loading or initializing by the runtime, according to its specified lifecycle semantics, the containing or implementing bundle, includes calling into bundle specific or specified initialization code.

7. The system of claim 1, wherein the runtime to control component service dependency lifecycle comprises one of Open Services Gateway initiative (OSGi) or Java Module System runtimes, and wherein during deployment any unsatisfied references are delegated to the OSGi or Java Module System runtime as appropriate to subsequently satisfy from its knowledge base of types and containing/implementing bundles.

8. A method for the dynamic, application dependency implicit, service configuration of application server environments, comprising the steps of:

providing a collection of Application Programming Interfaces (APIs) that are provided as named API bundles or modules, and that expose a set of Java language types;

compiling an application that is configured to use a subset of the APIs, against the API bundles or modules;

packaging resulting application class files in another bundle or module; and deploying the packaged application into an application server that includes a runtime to control component service dependency lifecycles, wherein the runtime includes a knowledge base of types and containing or implementing bundles, and a set of public APIs and/or components;

wherein the application server subsequently initializes the application for execution, and wherein, as individual application classes are loaded by the runtime, the runtime resolves the application's dependencies on the public APIs and/or components of the application server, including interrogating the application's packages, determining unsatisfied references to particular Java language types, and invoking the runtime to satisfy the unsatisfied references using its knowledge base, and as each containing or implementing bundle is identified, loading or initializing by the runtime, according to its specified lifecycle semantics, the containing or implementing bundle.

9. The method of claim 8, wherein the packaging the resulting application class files in another bundle or module further comprises packaging an appropriate meta-data describing the application's dependencies on public APIs and/or components of the application server, either as a list of dependent Java language types, or by direct reference to a list of defining/containing standard modules or bundles.

10. The method of claim 8, wherein the runtime to control component service dependency lifecycles comprises one of Open Services Gateway initiative (OSGi) or Java Module System runtimes.

11. The method of claim 10, wherein the runtime comprises a Java Virtual Machine, and wherein the Java Virtual Machine invokes a class loading component associated with a container particular to the subset of the APIs, which then recursively invokes a class loading component of the one of OSGi or Java Module System runtimes, to resolve the application's dependencies on the public APIs and/or components of the application server.

12. The method of claim 10, wherein when invoked the one of OSGi or Java Module System runtimes determines in which bundle or module a particular type reference resides, and if that reference, bundle or module has not previously been referenced then the runtime loads that bundle or module, initializes it according to its lifecycle models, and satisfies any class loading reference.

13. The method of claim 8, wherein the loading or initializing by the runtime, according to its specified lifecycle semantics, the containing or implementing bundle, includes calling into bundle specific or specified initialization code.

14. The method of claim 8, wherein the runtime to control component service dependency lifecycle comprises one of Open Services Gateway initiative (OSGi) or Java Module System runtimes, and wherein during deployment any unsatisfied references are delegated to the OSGi or Java Module System runtime as appropriate to subsequently satisfy from its knowledge base of types and containing/implementing bundles.

15. A non-transitory computer readable medium, including instructions stored thereon which when read and executed by a computer cause the computer to perform the steps of:

providing a collection of Application Programming Interfaces (APIs) that are provided as named API bundles or modules, and that expose a set of Java language types;

compiling an application that is configured to use a subset of the APIs, against the API bundles or modules;

packaging resulting application class files in another bundle or module; and deploying the packaged application into an application server that includes
- a runtime to control component service dependency lifecycles, wherein the runtime includes a knowledge base of types and containing or implementing bundles, and
- a set of public APIs and/or components;

wherein the application server subsequently initializes the application for execution, and wherein, as individual application classes are loaded by the runtime, the runtime resolves the application's dependencies on the public APIs and/or components of the application server, including
- interrogating the application's packages,
- determining unsatisfied references to particular Java language types, and invoking the runtime to satisfy the unsatisfied references using its knowledge base, and as each containing or implementing bundle is identified, loading or initializing by the runtime, according to its specified lifecycle semantics, the containing or implementing bundle.

16. The non-transitory computer readable medium of claim 15, wherein the packaging the resulting application class files in another bundle or module further comprises packaging an appropriate meta-data describing the application's dependencies on public APIs and/or components of the application server, either as a list of dependent Java language types, or by direct reference to a list of defining/containing standard modules or bundles.

17. The non-transitory computer readable medium of claim 15, wherein the runtime to control component service dependency lifecycles comprises one of Open Services Gateway initiative (OSGi) or Java Module System runtimes.

18. The non-transitory computer readable medium of claim 17, wherein the runtime comprises a Java Virtual Machine, and wherein the Java Virtual Machine invokes a class loading component associated with a container particular to the subset of the APIs, which then recursively invokes a class loading component of the one of OSGi or Java Module System runtimes, to resolve the application's dependencies on the public APIs and/or components of the application server.

19. The non-transitory computer readable medium of claim 17, wherein when invoked the one of OSGi or Java Module System runtimes determines in which bundle or module a particular type reference resides, and if that reference, bundle or module has not previously been referenced then the runtime loads that bundle or module, initializes it according to its lifecycle models, and satisfies any class loading reference.

20. The non-transitory computer readable medium of claim 15, wherein the step of loading or initializing by the runtime, according to its specified lifecycle semantics, the containing or implementing bundle, includes calling into bundle specific or specified initialization code.

* * * * *

UNITED STATES PATENT AND TRADEMARK OFFICE
CERTIFICATE OF CORRECTION

PATENT NO.      : 8,490,120 B2
APPLICATION NO. : 12/209175
DATED           : July 16, 2013
INVENTOR(S)     : Cable Page 1 of 1

It is certified that error appears in the above-identified patent and that said Letters Patent is hereby corrected as shown below:

In the Specification

In column 3, line 11, delete "description" and insert -- description. --, therefor.

In column 3, line 23, delete "class" and insert -- .class --, therefor.

In column 3, line 32, delete "class" and insert -- .class --, therefor.

In column 3, line 40, before "a" delete "an".

In column 4, line 28, delete "jar)" and insert -- .jar) --, therefor.

In column 4, line 65, delete "class" and insert -- .class --, therefor.

Signed and Sealed this
Twenty-second Day of October, 2013

Teresa Stanek Rea
*Deputy Director of the United States Patent and Trademark Office*